(12) United States Patent
Tottewitz et al.

(10) Patent No.: US 12,392,726 B2
(45) Date of Patent: Aug. 19, 2025

(54) SENSOR POSITIONING DEVICE AND SENSOR

(71) Applicant: Exner & Tottewitz Besitz GbR, Ettlingen (DE)

(72) Inventors: Michael Tottewitz, Bruchsal (DE); Detlef Exner, Mönsheim (DE); Gabriel Cremers, Marxzell (DE); Yasar Güney, Ettlingen (DE)

(73) Assignee: Exner + Tottewitz Besitz GbR, Ettlingen (DE)

( * ) Notice: Subject to any disclaimer, the term of this patent is extended or adjusted under 35 U.S.C. 154(b) by 128 days.

(21) Appl. No.: 18/493,952

(22) Filed: Oct. 25, 2023

(65) Prior Publication Data
US 2024/0142384 A1     May 2, 2024

(30) Foreign Application Priority Data

Oct. 26, 2022 (EP) ..................................... 22203842

(51) Int. Cl.
*G01N 21/85*     (2006.01)
(52) U.S. Cl.
CPC ... *G01N 21/8507* (2013.01); *G01N 2201/086* (2013.01); *G01N 2201/088* (2013.01)
(58) Field of Classification Search
CPC ......... G01N 21/8507; G01N 2201/086; G01N 2201/088; G01N 2021/4742; G01N 2021/4769; G01N 21/474; G01N 21/53; G01N 21/01; H01R 13/6277
See application file for complete search history.

(56) References Cited

U.S. PATENT DOCUMENTS

| 4,707,134 A | 11/1987 | McLachlan et al. |
| 4,909,588 A | 3/1990 | Harner et al. |
| 10,158,193 B2* | 12/2018 | Scheibe ............. H01R 13/6584 |
| 11,143,582 B2* | 10/2021 | Wolfe ................ G01N 15/0211 |

FOREIGN PATENT DOCUMENTS

| DE | 4242083 | 6/1994 |
| DE | 102016008826 | 1/2018 |
| DE | 102018108325 B4 | 7/2020 |

(Continued)

*Primary Examiner* — Hung V Nguyen
(74) *Attorney, Agent, or Firm* — Volpe Koenig

(57) ABSTRACT

A sensor positioning device, having a holding module, with a sensor receptacle, fastening element and spring element, the sensor receptacle being mounted movably relative to the fastening element along a compensating axis. The spring is arranged between the fastening element and the sensor receptacle to cooperate therewith, to create a restoring force during movement of the receptacle relative to the fastening element. A measurement connector with an abutment is configured for arrangement onto a process container, and is configured for releasable arrangement on the holding module. The sensor positioning device is configured such that, when the measurement connector is arranged on the holding module, the sensor receptacle is movable relative to the fastening element along the axis, and a pressing force of the sensor receptacle onto the abutment of the measurement connector is created by the spring. A sensor unit, for turbidity measurement, is provided having the sensor positioning device.

20 Claims, 2 Drawing Sheets

(56) References Cited

FOREIGN PATENT DOCUMENTS

| | | |
|---|---|---|
| DE | 102020107763 | 9/2021 |
| DE | 102023106076 B4 | 11/2024 |
| EP | 0191112 B1 | 12/1990 |
| EP | 0326511 B1 | 2/1992 |
| EP | 3553160 | 10/2019 |
| WO | 2008016411 A1 | 2/2008 |
| WO | 2009017721 A2 | 2/2009 |
| WO | 2018129122 A1 | 7/2018 |

* cited by examiner

SENSOR POSITIONING DEVICE AND SENSOR

CROSS-REFERENCE TO RELATED APPLICATIONS

This application claims priority to European Patent Application No. 22203842.4, filed Oct. 26, 2022, which is incorporated herein by reference as if fully set forth.

TECHNICAL FIELD

The invention relates to a sensor positioning device and to a sensor unit.

BACKGROUND

Sensors are used for example in chemical, biochemical and pharmaceutical plants, particularly in order to determine state variables, for example the concentration of a medium.

Inside the plants, process containers are used in order to carry out chemical, biological or pharmaceutical processes therein.

In principle, process containers may be configured for multiple use, although particularly in the field of pharmaceutical application it is customary to use so-called disposable process containers.

An advantage of the use of disposable bioreactors is that the setup times can be shortened. This is made possible because elaborate cleaning and sterilization operations are obviated.

Customary sensors for process containers that are configured for multiple use are very cost-intensive and therefore not suitable for single application in disposable process containers. The interfaces required, the so-called attachment connectors for connecting the sensors to the process containers, are subject to a standard for process containers that are configured for multiple use. For disposable process containers, on the other hand, the configuration of the attachment connector may vary depending on the manufacturer of the disposable process container.

Most conventional sensors for process containers that are configured for multiple use are in direct contact with the medium (invasively) inside the process container and are provided and sterilized before the start of the process together with the process container. Disposable process containers are delivered pre-sterilized, and must therefore already have a sensor if additional sterilization is not intended to be necessary. Subsequently arranging a sensor on an already sterilized disposable process container entails the disadvantage that sterilization must be carried out again with the sensor.

Furthermore, process-related temperature changes lead to undesired material expansions of the sensor components in the interior of the sensor. Particularly in the case of fiber-optic sensors, this leads to undesired position changes of the fibers, which necessitates elaborate compensation for the change in order to achieve a consistent measurement accuracy.

For example, U.S. Pat. No. 4,707,134 describes a fiber-optic sensor which uses a compensating element in order to keep the fibers at a desired position. A disadvantage of this configuration is, however, that the proposed mechanism can be used only for invasive sensors.

SUMMARY

On the basis of this prior art, it is an object of the present invention to provide a sensor which makes it possible to carry out non-invasive measurements inside a process container. It is also an object of the present invention to provide a device which makes it possible to position such a sensor simply and in an accurate position. It is a further object of the present invention to propose a device for straightforwardly using sensors in a repeatedly usable fashion on disposable process containers.

This object is achieved according to the invention by a sensor positioning device and by a sensor unit having one or more of the features disclosed herein.

Preferred configurations of the sensor positioning device according to the invention are described below and in the claims. Preferred configurations of the sensor unit according to the invention are also described below and in the claims. The wording of all claims is hereby explicitly incorporated into the description by reference.

The sensor positioning device according to the invention has a holding module, which has a sensor receptacle, a fastening element and a spring element. The sensor receptacle furthermore has a cavity for receiving a sensor, in particular an optical sensor. The sensor receptacle is mounted movably in relation to the fastening element along a compensating axis. Furthermore, the spring element is arranged between the fastening element and the sensor receptacle in such a way as to cooperate therewith, in order to create a restoring force during the movement of the sensor receptacle in relation to the fastening element along the compensating axis.

What is essential here is that the sensor positioning device has a measurement connector with an abutment, the measurement connector being configured for arrangement onto a process container. It is further essential that the measurement connector is configured for releasable arrangement on the holding module. It is furthermore essential that the sensor positioning device is configured in such a way that, when the measurement connector is arranged on the holding module, the sensor receptacle is movable relative to the fastening element along the compensating axis, and that a pressing force of the sensor receptacle onto the abutment of the measurement connector is created by means of the spring element.

It is advantageous that sensors which carry out non-invasive measurements can be fitted on a process container by means of the sensor receptacle of the sensor positioning device.

It is also advantageous that consistent positioning on the abutment of the measurement connector is achieved by applying a pressing force to the sensor receptacle. Thermally induced expansions of the materials are also advantageously compensated for by the consistent positioning.

It is also advantageous that positioning inaccuracies can be compensated for by the pressing of the sensor receptacle onto the abutment of the measurement connector when the measurement connector is being arranged onto the holding module, so as to increase the reproducibility of measurements.

It is also advantageous that the holding module is configured to be releasable from the measurement connector in order to fasten it on further measurement connectors. Since the holding module is not directly in contact with the medium to be tested, sterilization, for example by autoclaving the holding module, may be obviated so that economical materials may be employed and the production costs may be reduced.

In one preferred embodiment, the fastening element is configured as a coupling sleeve and the measurement connector is configured as a coupling plug, or the fastening element is configured as a coupling plug and the measurement connector is configured as a coupling sleeve, the coupling plug being insertable into the coupling sleeve. Furthermore, the sensor positioning device has a locking device, the locking device being configured to lock the coupling plug with a form-fit to the coupling sleeve in a locking position. Further, the locking device is configured to unlock the coupling plug and the coupling sleeve in an unlocking position.

In a modified embodiment, the fastening element is configured as a coupling plug and the measurement connector is configured as a coupling sleeve, the coupling plug of the fastening element being insertable into the coupling sleeve of the measurement connector. Furthermore, the measurement connector has a locking device, the locking device being configured to lock the coupling plug with a form-fit to the coupling sleeve in a locking position. Further, the locking device is configured to unlock the coupling plug and the coupling sleeve in an unlocking position.

An advantage of the aforementioned preferred embodiment and of the modified embodiment is that the holding module can be arranged straightforwardly on the measurement connector by the embodiment. Furthermore, the embodiment offers the advantage of rapid fitting or rapid release of the holding module, in particular when a plurality of measurements are carried out in a short time with the sensor on different process containers or in different measurement connectors of the same process container.

In one preferred embodiment, the measurement connector is configured to be releasable by means of a quick-release coupling connection, a latch connection, a bayonet connection or a screw connection for arrangement on the holding module.

An advantage of this embodiment is that the holding module can be arranged straightforwardly on the fastening element by the connecting modes. In particular, the embodiment with quick-release coupling offers the advantage that both rapid fitting and rapid release of the sensor are thus possible. Another advantage is that one-handed positioning of the sensor inside the measurement connector is possible, in particular when using the quick-release coupling.

In one preferred embodiment, the holding module is configured for arrangement of the measurement connector by means of a quick-release coupling connection, a latch connection, a bayonet connection or a screw connection.

This embodiment likewise has the aforementioned advantages in relation to the connecting mode.

In one preferred embodiment, the cavity of the sensor receptacle is sealed on one side with an optical element, in particular a measurement window of the sensor receptacle.

An advantage of this embodiment is that, by a measurement window, measurement beams which are emitted by a sensor in the direction of the measurement window are not absorbed or are absorbed only little by the measurement window, and the same applies for incident radiation reflected or generated in the medium. The measurement window therefore preferably has a transparency in a wavelength range which corresponds to the measurement range of the sensor. A further advantage is that when a sensor is arranged in the sensor receptacle, the sensor components are protected by a seal against moisture, mechanical damage and dust.

In one preferred embodiment, the optical element of the sensor receptacle is configured to bear on the abutment of the measurement connector when the measurement connector is arranged onto the holding module, and in particular the optical element of the sensor receptacle overlaps at least partially, preferably fully, with the abutment of the measurement connector when the measurement connector is arranged onto the holding module.

An advantage of this embodiment is that by the sensor receptacle bearing onto the abutment of the measurement connector, the measurement beams which are emitted by a sensor in the direction of the abutment are not absorbed or reflected, or are absorbed or reflected only slightly, by the alignment of the elements, and the same applies for incident radiation reflected or generated in the medium.

In one preferred embodiment, the abutment of the measurement connector has a measurement window. In particular, the abutment of the measurement connector is preferably configured as a measurement window.

An advantage of this embodiment is that measurement radiation, which is emitted by the sensor via the optical waveguides in the direction of the measurement window, can therefore be transmitted directly through the measurement window. The same applies for incident or reflected radiation. Furthermore, separation is therefore achieved between the medium inside the process container and the sensor receptacle, and this prevents contamination.

In one preferred embodiment, the fastening element encloses the sensor receptacle at least when the measurement connector is arranged onto the holding module.

An advantage of this embodiment is that the forces which occur when the fastening element is arranged onto the measurement connector are introduced uniformly via the spring element, which is also surrounded by the fastening element, into the sensor receptacle. The uniform introduction of the forces counteracts tilting or inclination of the sensor receptacle away from the compensating axis.

In one preferred embodiment, the measurement connector and the holding module, when the measurement connector is arranged onto the holding module, are arranged concentrically, and in particular the fastening element, the sensor receptacle and the measurement connector are arranged concentrically.

An advantage of this embodiment is that simple arrangement of the individual elements is therefore possible. A further advantage of the concentric arrangement of the elements is the small space requirement.

In one preferred embodiment, the elements of the holding module are configured inseparably, so that the module per se can be arranged onto the measurement connector and released therefrom.

An advantage of this embodiment is that the holding module can be positioned straightforwardly on the measurement connector.

In one preferred embodiment, the elements of the holding module are therefore arranged non-releasably with respect to one another.

In one preferred embodiment, the sensor receptacle is configured cylindrically, in particular as a circular cylinder.

An advantage of this embodiment is that the sensing components of a sensor located in the cavity can therefore be introduced straightforwardly into the measurement connector.

In one preferred embodiment, the spring element is configured as a spring, in particular a compression spring or as a tension spring, preferably as a compression spring.

An advantage of an embodiment with a spring is that the spring may be configured with a linear spring characteristic. In addition, when configuring the spring as a compression spring, it is advantageous that the compression spring can be positioned straightforwardly between the fastening element and the sensor receptacle, in order to achieve the desired effect.

The sensor unit according to the invention has a sensor and a sensor positioning device.

The sensor unit according to the invention is preferably configured for optical measurement in the medium, particularly preferably for turbidity measurement. It is likewise within the scope of the invention to configure the sensor unit for other measurement methods.

The sensor unit has a sensor positioning device, what is essential being that the sensor positioning device is configured as a sensor positioning device according to the invention, in particular according to a preferred embodiment of the sensor positioning device according to the invention. It is furthermore essential that the sensor is arranged in the cavity of the sensor receptacle of the sensor positioning device.

An advantage of this is that the sensor is guided by the sensor receptacle of the sensor positioning device and precise positioning of the sensor may therefore be carried out. In addition, the sensor unit is distinguished in particular by simple and practical handling.

In one preferred embodiment, the sensor is suitable for carrying out optical & spectroscopic measurement methods, particularly in one of the ranges UV, VIS, NIR or MIR spectral range, but not restricted to this spectral range.

In one preferred embodiment, the sensor is configured with at least two optical waveguides, which are arranged in the sensor receptacle of the sensor positioning device. The at least two optical waveguides respectively have a free end, which is held inside the sensor receptacle of the sensor positioning device with a holding instrument in a position facing toward the abutment of the measurement connector of the sensor positioning device.

An advantage of this embodiment is that emitted light may be guided in one of the at least two optical waveguides and detected light may be guided in a second of the at least two optical waveguides. Another advantage is that light can be introduced straightforwardly into the optical waveguides through the free ends of the optical waveguides. An advantage of the holding device is that it positions the optical waveguides easily and precisely, and the holding device furthermore protects the optical waveguides against bending forces and tensile forces which occur. An advantage of holding the optical waveguides in a position facing toward an abutment of the measurement connector is that light signals coming from the direction of the abutment may thus purposely be recorded.

In one preferred embodiment, when the measurement connector of the sensor positioning device is arranged onto the holding module of the sensor positioning device, the free ends of the optical waveguides bear directly on the abutment.

An advantage of this embodiment is that, in particular when the abutment is configured as a measurement window, measurement radiation which is emitted by the sensor via the optical waveguides in the direction of the measurement window is therefore transmitted directly through the measurement window without being subject to path-induced inaccuracies. The same applies for incident or reflected radiation.

In one preferred embodiment, the at least two optical waveguides are arranged in such a way that a common optical point of intersection occurs in extension of the free ends of the optical waveguides along an extension axis, and in particular a common point of intersection occurs when the measurement connector is arranged onto the holding module on that side of the abutment of the measurement connector of the sensor positioning device facing away from the free ends of the optical waveguides.

An advantage of this embodiment is that with this arrangement of the optical waveguides, particularly in a sensor unit for turbidity measurement, one optical waveguide guiding emitted light and a further optical waveguide receiving reflected light, a measurement field illuminated by the measurement radiation is achieved.

In one preferred embodiment, the at least two optical waveguides are respectively formed by optical fibers or by fiber bundles.

An advantage of the embodiment with optical fibers is that the optical fibers may be coupled straightforwardly to optoelectronic elements. An advantage of the embodiment with fiber bundles is that a higher light power and higher optical intensities can be transmitted by fiber bundles.

In one preferred embodiment, at least one of the two optical waveguides of the sensor is formed by a fiber bundle.

In a further preferred embodiment, the optical waveguides of the sensor are combined at least locally as a bundle. In particular, it is advantageous to form the optical waveguides of the sensor respectively as a fiber or fiber bundle and to combine all the optical waveguides of the sensor at least locally to form a fiber bundle.

An advantage of this embodiment is that compact guiding is possible by the local combination of the optical waveguides to form a bundle.

The sensor positioning device according to the invention and/or the sensor unit according to the invention are suitable in principle for applications in process monitoring, in particular bioprocess monitoring.

Usual optical waveguides such as single-mode optical waveguides, multimode optical waveguides, polarization-maintaining optical waveguides or optical plastic fibers are preferably used as optical waveguides.

In a further advantageous embodiment, the material of the measurement window of the sensor receptacle and of the abutment of the measurement connector, which is configured as a measurement window, is formed from a transparent material, preferably a material which is transparent at least for the optical or spectroscopic measurement range used. The measurement window is preferably formed from glass, in particular from glass ceramic, particularly preferably from sapphire glass.

In a further advantageous embodiment, the measurement connector of the sensor positioning device is made from a biocompatible material, in particular polyethylene (PE), preferably polyaryl ether ketone (PAEK), preferably polyethylene terephthalate (PET) or polypropylene (PP) or polyamide (PA), in particular polyether ether ketone (PEEK), preferably polyphenylene sulfone (PPSU).

In one preferred embodiment, the measurement connector has an additional fixing element, the latter being configured to fix the measurement connector onto an attachment connector of a process container, in particular of a disposable process container.

An advantage of this embodiment is that an existing process container, in particular a disposable process container, may therefore be provided straightforwardly with a measurement connector in order to fasten the holding module thereon.

Typical attachment connectors of process containers, in particular of bioreactors, have an opening.

In one preferred embodiment, the measurement connector of the sensor positioning device is configured to allow fluid-tight arrangement onto the process container. In particular, the measurement connector of the sensor positioning device and an attachment connector of the process container are preferably configured interactively so that the attachment connector of the process container can be sealed in a fluid-tight manner by the measurement connector of the sensor positioning device.

BRIEF DESCRIPTION OF THE DRAWINGS

Further preferred features and embodiments of the sensor positioning device according to the invention and of the sensor unit according to the invention will be explained below with the aid of exemplary embodiments and the figures. The exemplary embodiments are merely advantageous configurations of the invention and are not restrictive.

DETAILED DESCRIPTION

In FIGS. 1A, 1B, and 2A-2D, reference signs which are the same denote elements which are the same or have the same effect.

Figure 1A:
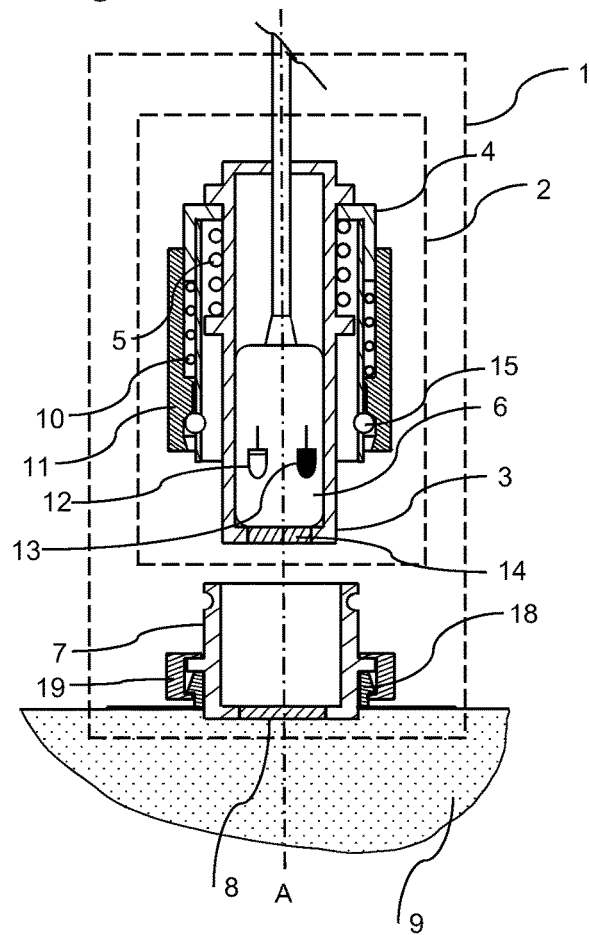
FIGS. 1A and 1B: show two partial views with schematic representations of exemplary embodiments of a sensor unit having a sensor positioning device, in the state not arranged onto a measurement connector FIGS. 1A and 1n the state arranged onto the measurement connector in FIG. 1B, and FIGS. 2A-2D: show four partial images with schematic representations of exemplary embodiments of a holding module of a sensor unit.
Figure 1B:
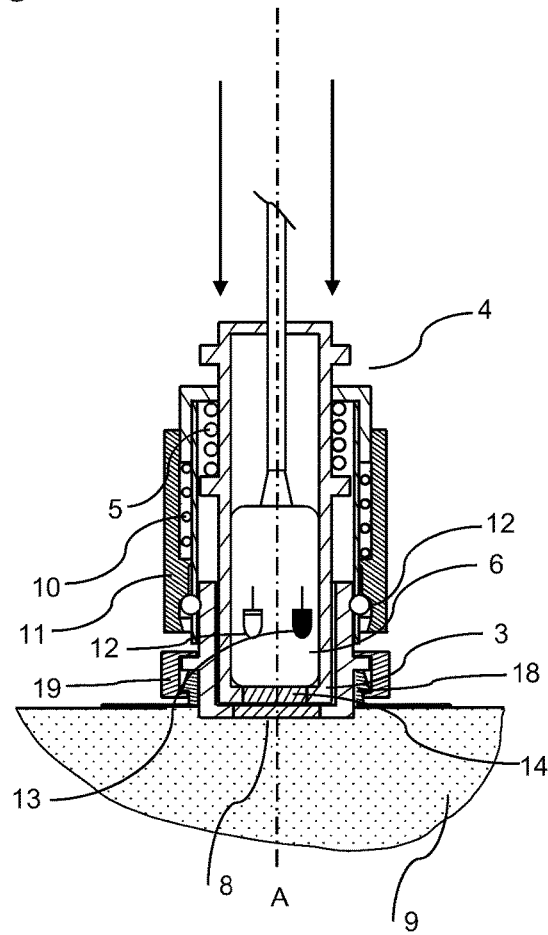

FIG. 1A shows a partial image of a schematic representation of a sensor unit having a sensor positioning device 1 in the non-arranged state. The sensor positioning device 1 in this exemplary embodiment has a holding module 2, which in this exemplary embodiment is formed with a quick-release coupling. The sensor positioning device 1 furthermore has a sensor receptacle 3.

This sensor receptacle 3 forms a cavity in which a sensor 6 is located. The cavity is sealed on one side by a measurement window 14. This measurement window 14 is transmissive in an electromagnetic waveband, in this exemplary embodiment for electromagnetic waves in the UV range. The sensor 6 located in the cavity is configured as an optical sensor 6. In order to emit measurement signals, the sensor 6 has an LED 12 which emits electromagnetic waves in the UV range, the sensor 6 also having a detector, this detector being sensitive in this exemplary embodiment in the UV range in order to detect UV light.

The sensor receptacle 3 and the fastening element are arranged concentrically with respect to a compensating axis A, while the holding module 2 encloses the sensor receptacle 3. The sensor receptacle 3 in this exemplary embodiment has two annular moldings, these moldings extending radially and therefore forming two projections spaced apart from one another. The fastening element is in this exemplary embodiment composed of a locking device, which comprises an unlocking sleeve 11, a locking spring element 10 and a locking element 15, and of a connecting shoulder 4. The connecting shoulder 4 has a circular-cylindrical base body, which is sealed on one side by a shoulder ring.

The shoulder ring of the connecting shoulder is positioned between the projections of the sensor receptacle 3, so that the cylindrical base body overlaps the sensor receptacle 3 in the direction of the compensating axis. The spring element 5 is arranged between the shoulder ring of the connecting shoulder 4 and the annular molding of the sensor receptacle 3, which lies closest to the side sealed with the measurement window 14. The spring element 5 is a compression spring in this exemplary embodiment. The cylindrical base body of the connecting shoulder 4 overlaps the compression spring in the direction of the compensating axis.

The spring element 5 is not yet arranged on the measurement connector in this state, and is uncompressed and therefore not loaded. The sensor receptacle 3 is mounted movably in relation to the fastening element along the compensating axis A. If the sensor receptacle 3 is moved relative to the fastening element in the direction of the shoulder ring, the compression spring is compressed and a spring force is created, and this restoring force acts against the force which is created due to the movement.

The measurement connector 7 has a circular-cylindrical base body, which is sealed on one side with an abutment 8. In this exemplary embodiment, the abutment 8 is formed by a measurement window.

The measurement connector is arranged on a process container 9. For this purpose, the process container 9 has an attachment connector 18 with an opening. The attachment connector 18 is sealed in a fluid-tight fashion by the measurement connector 7.

The process container 9 is filled with a medium, the state of which is intended to be recorded. In order to fix the measurement connector onto the attachment connector of the process container 9, the measurement connector has a connector abutment, this connector abutment being placed on the attachment connector of the process container 9 and secured in this position by means of a securing element 19.

The cylindrical base body of the measurement connector has a coupling plug. This coupling plug has an annular, radially extending semicircular groove. In the assembled state, this groove makes it possible to establish a form-fit connection to the locking element 15 of the locking device of the fastening element, so as to establish a form-fit connection to the fastening element configured as a sleeve.

The sensor 6 of the sensor unit is intended to be positioned into the cavity of the measurement connector 7, for which purpose the holding module 2 is arranged coaxially with the cylinder axis of the measurement connector 7, and the holding module 2 is moved in the direction of the measurement connector 7 so that the sensor receptacle 3 is moved into the cavity of the measurement connector 7 along the compensating axis in the direction of the measurement window.

When the bearing position of the sensor receptacle 3 is reached, the measurement window 14 of the sensor receptacle 3 of the holding module 2 bears on the measurement window 8 of the measurement connector. However, when the bearing position of the sensor receptacle 3 is reached, the fastening element is not yet fixed on the measurement connector 7. The fastening element continues to be moved further along the compensating axis. During this movement, the sensor receptacle 3 is pressed against the spring element 5 until it reaches the fixing position. When the fixing position is reached, the coupling connector of the measurement connector 7 is inserted into the sleeve of the fastening element and is connected with a form-fit by means of the locking element 15, in this exemplary embodiment a sphere.

The locking device prevents unintentional release of the fastening element from the measurement connector. The restoring force of the spring element 5 which is created is maintained by the fixing, the effect of which is that the sensor receptacle 3, in particular the measurement window 14 of the sensor receptacle 3, is pressed onto the measurement window 8 of the measurement connector 7. In this state, the fastening element encloses the sensor receptacle 3 and a part of the measurement connector 7.

In order to release the sensor unit, the unlocking sleeve 11 is moved counter to the pressing direction of the sensor receptacle 3. By the movement, the locking spring element 10 is compressed and the locking element 15 is freed, so that the form-fit connection between the fastening element and the measurement connector 7 is broken.

Figure 2A:
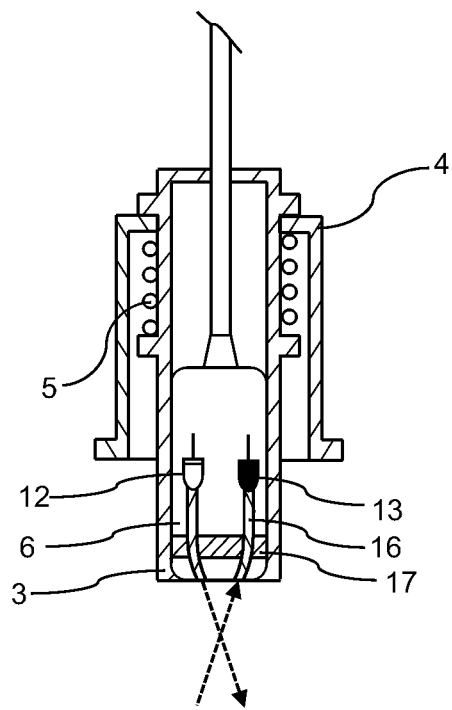

Partial FIG. 2A shows an exemplary embodiment of a sensor unit, which differs from the sensor unit of the first exemplary embodiment in that the holding module 2 is fixed on a measurement connector 7 by means of a further type of the configuration of the fastening element, the fastening element in this case having an annular molding which is arranged with a form-fit into a groove of the measurement connector 7. For the locking, a locking element 15 of the measurement connector 7 is used. The associated measurement connector 7 is not shown in this figure.

The exemplary embodiment 2A furthermore differs from the first exemplary embodiment in that the sensor receptacle 3 is not sealed by a measurement window. In this exemplary embodiment, an optical waveguide 16 is respectively attached to the emitting diode 12 and the detecting diode 13. The optical waveguides 16 are configured as optical fiber bundles in this exemplary embodiment. These fiber bundles 16 are arranged at a distance from one another and have an open end. These fiber bundles 16 are respectively oriented along the compensating axis.

The fiber bundles 16 are held in a position facing toward the measurement window 8 of the measurement connector 7 by a holding instrument 17. The fiber bundles 16 are arranged in this exemplary embodiment in such a way that a common point of intersection occurs in extension of the free ends. In this exemplary embodiment, in the state of the holding module 2 arranged on the measurement connector 7, the point of intersection of the extensions lies on the side of the measurement window of the measurement connector 7 facing away from the free ends of the fiber bundles.

If the sensor receptacle 3 is moved relative to the fastening element, the spring element 5 is compressed and a spring force is created, this restoring force acting against the force which is applied by the movement.

Figure 2B:
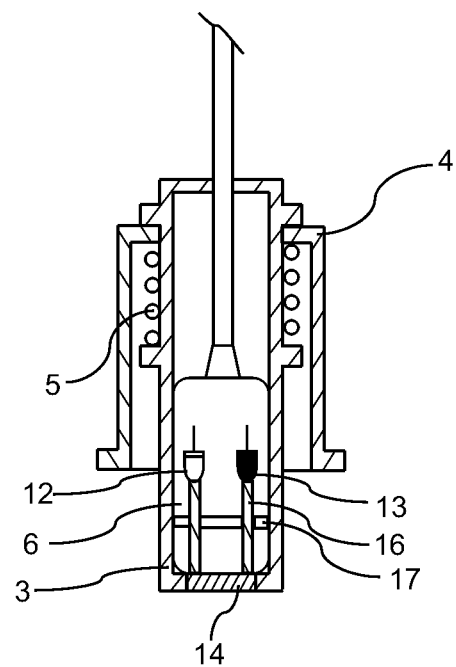

Partial FIG. 2B shows an exemplary embodiment of a sensor unit which differs from the sensor unit of the exemplary embodiment of partial FIG. 2A in that the sensor receptacle 3 is sealed by a measurement window 14 as in the first exemplary embodiment. In this case, the open ends of the optical waveguides 16 are arranged directly onto the measurement window 14. The optical waveguides are respectively configured as optical fibers in this exemplary embodiment.

Figure 2C:
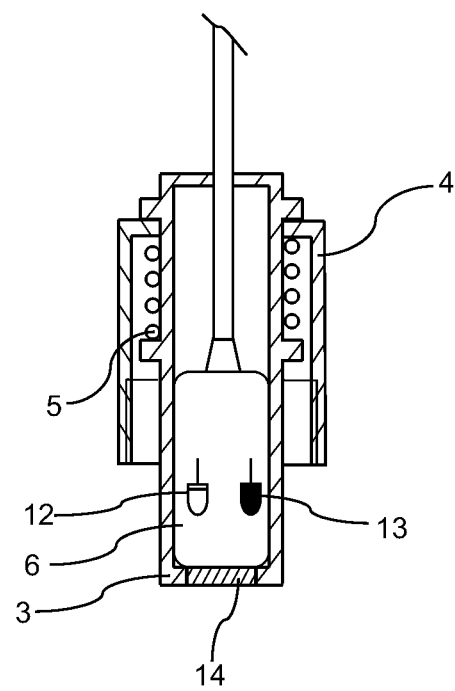

Partial FIG. 2C shows an exemplary embodiment of a sensor unit, which differs from the sensor unit of the exemplary embodiment of partial FIG. 2B in that the fastening element has an internal screw thread for fixing onto a measurement connector which has an external screw thread.

Figure 2D:
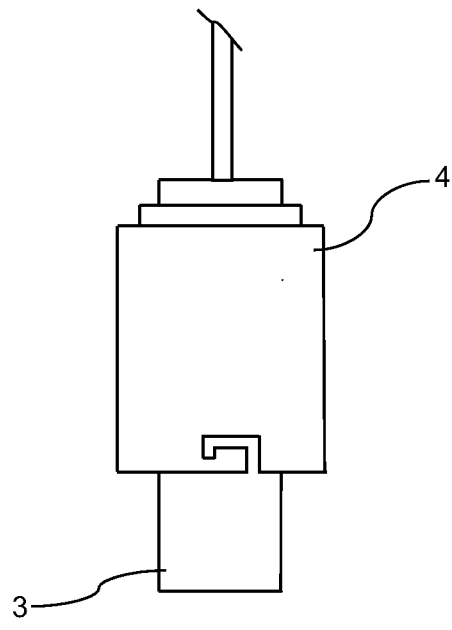

Partial FIG. 2D shows an exemplary embodiment of a sensor unit, which differs from the sensor unit of the exemplary embodiment of partial FIG. 2C in that the fastening element has an elongate slot, the end of which is followed at a right angle to this longitudinal slot by a short transverse slot, which has a latching position at the end. By means of this configuration, a rapidly producible and releasable mechanical connection may be established between the fastening element and a measurement connector 7, which has a button-shaped molding on the cylindrical base body. In this case, the button-shaped molding can be inserted via the longitudinal slot and introduced into the transverse slot by a rotational movement until the button-shaped molding reaches the latching position. By this exemplary embodiment, a bayonet connection may straightforwardly be formed between the holding module 2 and the measurement connector 7.

LIST OF REFERENCE SIGNS 1 sensor positioning device
2 holding module
3 sensor receptacle
4 connecting shoulder
5 spring element
6 sensor
7 measurement connector
8 abutment/measurement window of the measurement connector
9 process container
10 locking spring element
11 unlocking sleeve
12 emitter
13 detector
14 measurement window of the sensor receptacle
15 locking element
16 optical waveguide(s)/fiber bundle(s)
17 holding instrument
18 attachment connector
19 securing element

The invention claimed is:

1. A sensor positioning device (1), comprising:
a holding module (2), which has a sensor receptacle (3), a fastening element and a spring (5);
the sensor receptacle (3) having a cavity for receiving a sensor (6);
the sensor receptacle (3) is mounted movably in relation to the fastening element along a compensating axis;
the spring (5) is arranged between the fastening element and the sensor receptacle (3) and cooperates therewith, in order to create a restoring force during a movement of the sensor receptacle (3) relative to the fastening element along the compensating axis;
a measurement connector (7) with an abutment (8), the measurement connector (7) being configured for arrangement onto a process container (9);
the measurement connector (7) is configured for releasable arrangement on the holding module (2); and
wherein the sensor positioning device (1) is configured such that, when the measurement connector (7) is arranged on the holding module (2), the sensor receptacle (3) is movable relative to the fastening element along the compensating axis, and a pressing force of the sensor receptacle (3) onto the abutment (8) of the measurement connector (7) is created by the spring (5).

2. The sensor positioning device (1) as claimed in claim 1, wherein
the fastening element forms a coupling sleeve and the measurement connector (7) forms a coupling plug, or the fastening element forms the coupling plug and the measurement connector (7) forms the coupling sleeve,
the coupling plug being configured to be insertable into the coupling sleeve,
the sensor positioning device further comprising a locking device that is configured to lock the coupling plug with a form-fit to the coupling sleeve in a locking position, and
the locking device is configured to unlock the coupling plug and the coupling sleeve in an unlocking position.

3. The sensor positioning device (1) as claimed in claim 1, wherein
the cavity of the sensor receptacle (3) is sealed on one side with an optical element.

4. The measurement device of claim 3, wherein the optical element comprises a measurement window (14) of the sensor receptacle (3).

5. The sensor positioning device (1) as claimed in claim 3, wherein
the optical element is configured to bear on the abutment (8) of the measurement connector (7) when the measurement connector (7) is arranged onto the holding module (2).

6. The sensor positioning device (1) as claimed in claim 5, wherein the optical element of the sensor receptacle (3) overlaps at least partially with the abutment (8) of the measurement connector (7) when the measurement connector (7) is arranged onto the holding module (2).

7. The sensor positioning device (1) as claimed in claim 1, wherein
the abutment of the measurement connector comprises a measurement window.

8. The sensor positioning device (1) as claimed in claim 1, wherein
the fastening element encloses the sensor receptacle (3) at least when the measurement connector (7) is arranged onto the holding module (2).

9. The sensor positioning device (1) as claimed in claim 1, wherein
the measurement connector (7) and the holding module (2), when the measurement connector (7) is arranged onto the holding module (2), are arranged concentrically.

10. The sensor positioning device (1) as claimed in claim 9, wherein the sensor receptacle (3) and the measurement connector (7) are arranged concentrically.

11. The sensor positioning device (1) as claimed in claim 1, wherein
the holding module (2) includes elements that are configured inseparably, so that the housing module per se can be arranged onto the measurement connector (7) and released therefrom.

12. The sensor positioning device (1) as claimed in claim 1, wherein
the sensor receptacle (3) is configured cylindrically.

13. The sensor positioning device (1) as claimed in claim 1, wherein
the measurement connector (7) is configured to be releasable by a quick-release coupling connection, a latch connection, a bayonet connection or a screw connection for arrangement on the holding module (2).

14. The sensor positioning device (1) as claimed in claim 1, wherein
the holding module (2) is configured for arrangement of the measurement connector (7) by a quick-release coupling connection, a latch connection, a bayonet connection or a screw connection.

15. The sensor positioning device as claimed in claim 1, wherein
the spring (5) comprises a compression spring or a tension spring.

16. A sensor unit, comprising:
the sensor positioning device (1) as claimed in claim 1; and
a sensor (6) arranged in the cavity of the sensor receptacle (3) of the sensor positioning device (1).

17. The sensor unit as claimed in claim 16, wherein
the sensor (6) is configured with at least two optical waveguides (16), which are arranged in the sensor receptacle (3) of the sensor positioning device; and
the at least two optical waveguides (16) respectively have a free end, which is held inside the sensor receptacle (3) of the sensor positioning device with a holding instrument (17) in a position facing toward the abutment (8) of the measurement connector (7) of the sensor positioning device (1).

18. The sensor unit as claimed in claim 17, wherein
when the measurement connector (7) of the sensor positioning device (1) is arranged onto the holding module (2) of the sensor positioning device (1), the free ends of the optical waveguides (16) bear directly on the abutment (8).

19. The sensor unit as claimed in claim 17, wherein
the at least two optical waveguides (16) are arranged such that a common optical point of intersection occurs in an extension of the free ends of the optical waveguides (16) along an extension axis.

20. The sensor unit as claimed in claim 19, wherein
a common point of intersection occurs when the measurement connector (7) is arranged onto the holding module (2) on a side of the abutment (8) of the measurement connector (7) of the sensor positioning device (1) facing away from the free ends of the optical waveguides (16).

* * * * *